United States Patent
Young et al.

(10) Patent No.: US 10,335,971 B2
(45) Date of Patent: Jul. 2, 2019

(54) APPARATUS FOR DIVERTING SOLID FOOD PIECES SUSPENDED IN A FLOWING LIQUID

(71) Applicant: Vanmark Equipment, LLC, Creston, IA (US)

(72) Inventors: Colter J. Young, Boise, ID (US); Christopher Paul Hebbeln, Boise, ID (US)

(73) Assignee: Vanmark Equipment LLC, Creston, IA (US)

( * ) Notice: Subject to any disclaimer, the term of this patent is extended or adjusted under 35 U.S.C. 154(b) by 372 days.

(21) Appl. No.: 14/925,215

(22) Filed: Oct. 28, 2015

(65) Prior Publication Data

US 2017/0120470 A1    May 4, 2017

(51) Int. Cl.
| | |
|---|---|
| B26D 7/06 | (2006.01) |
| B65G 51/01 | (2006.01) |
| B26D 1/02 | (2006.01) |
| F16L 41/02 | (2006.01) |

(52) U.S. Cl.
CPC ............ *B26D 7/0658* (2013.01); *B26D 1/02* (2013.01); *B65G 51/01* (2013.01); *F16L 41/02* (2013.01); *B26D 2210/02* (2013.01); *B65G 2201/0202* (2013.01)

(58) Field of Classification Search
CPC ............ Y10T 83/0453; Y10T 83/2066; Y10T 83/6472; Y10S 83/932; B26D 7/0658; B26D 7/06; B26D 1/02; B26D 2210/02; B65G 51/01; B65G 51/00; B65G 51/04; B65G 2201/0202; F16L 41/02

USPC .......................................... 406/191, 195, 34
See application file for complete search history.

(56) References Cited

U.S. PATENT DOCUMENTS

| | | | | |
|---|---|---|---|---|
| 3,337,273 A | * | 8/1967 | Farnworth | ........... B65G 53/521 406/195 |
| 4,450,825 A | * | 5/1984 | Sekiguchi | ............... F02D 21/08 123/568.27 |
| 4,536,104 A | | 8/1985 | Bungert | |
| 4,574,827 A | * | 3/1986 | Konak | .................... F16L 41/02 137/599.01 |

(Continued)

FOREIGN PATENT DOCUMENTS

| | | |
|---|---|---|
| EP | 0566176 | 10/1993 |
| JP | 50-88783 | 7/1975 |
| WO | 95/07426 A1 | 3/1995 |

*Primary Examiner* — Phong H Nguyen
(74) *Attorney, Agent, or Firm* — Jason H. Foster; Kremblas & Foster (57) ABSTRACT

A distributor valve for a hydrocutting system. The valve automatically diverts a flow of liquid and solid food products flowing from a source to one or both of two destinations. An entry conduit receives the suspended food products in liquid, and an angled plate deflects the food products downwardly. The food products and liquid enter a drum that is perpendicular to the entry conduit, causing rotational circulation in the drum. The food products and liquid flow into one or both of two longitudinally opposite outlets, depending on whether the path downstream of the outlets is flowing. Upon actuation of a valve on one side, or essentially complete blockage of one side, the fluid and products flow to the other side automatically. No moving parts are needed in the valve to change the flow path; the only change is to the flow downstream, which automatically affects the flow in the valve.

2 Claims, 6 Drawing Sheets

(56) References Cited

U.S. PATENT DOCUMENTS

| | | | |
|---|---|---|---|
| 4,614,141 A | | 9/1986 | Mendenhall et al. |
| 5,421,226 A | * | 6/1995 | Mendenhall ......... B23D 35/008 |
| | | | 83/22 |
| 5,433,250 A | | 7/1995 | Mendenhall |
| 5,568,755 A | | 10/1996 | Mendenhall |
| 5,645,381 A | * | 7/1997 | Guidetti ............... B65G 53/528 |
| | | | 110/104 R |
| 5,806,397 A | | 9/1998 | Mendenhall |
| 5,807,397 A | | 9/1998 | Barreras |
| 2003/0145698 A1 | * | 8/2003 | Bucks ................. B26D 7/0658 |
| | | | 83/13 |
| 2004/0130146 A1 | | 7/2004 | Mays |
| 2015/0157991 A1 | * | 6/2015 | Beg ...................... B01F 5/0057 |
| | | | 137/888 |
| 2017/0120470 A1 | | 5/2017 | Young et al. |

* cited by examiner

APPARATUS FOR DIVERTING SOLID FOOD PIECES SUSPENDED IN A FLOWING LIQUID

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to food cutting systems in which food pieces are suspended in flowing liquid, and more particularly to apparatuses used to divert the food pieces and liquid to one or more destinations.

Many food products, particularly vegetables and fruits, are processed prior to sale to preserve the food so it is safe and appealing at the time of consumption. Furthermore, unless they are in an edible size before processing, food products are sliced or otherwise shaped into an edible size during processing and prior to the preservation process, which can be canning or freezing, among others. Food product slicing is accomplished traditionally with sharpened blades. Such blades can be hand-held, but hand-held knives are relatively slow and dangerous to the person using them. Food cutting machines increase the rate and consistency of slicing, and provide a higher degree of safety in the food slicing industry. Machines have been developed for cutting food products at high speed by propelling them into a stationary or machine-driven blade.

Recent advances in food product cutting technologies have resulted in a hydraulically fed cutting apparatus. The driving force used in this system is moving water, and thus the process is called "hydraulic cutting", which is referred to by the shorthand term "hydrocutting". Hydrocutting involves the propulsion of water and food products, typically at very high speed, through a path that includes a stationary cutting blade. In the vegetable and fruit cutting industry, food products are sliced along the longitudinal axis (e.g., French fries) and along the transverse axis (e.g., potato chips). Production cutting systems and related knife fixtures are generally well known in the art of hydrocutting vegetable products. Typical hydrocutting systems have a stationary knife fixture that is mounted at a position along the path of the food product to slice parallel to the flow of water. Such parallel cutters usually cut or slice into strips or, with added motions, into a helical shape. In such a system, the food products are conveyed one-at-a-time in single file succession into the stationary cutting blades with enough kinetic energy to carry the product through the stationary knife fixture.

Hydraulic food cutters are used to cut a wide variety of food products, including potatoes, carrots, beets, zucchini, cucumbers, and others. Cutting potatoes has been the most common application of hydrocutting machines, but it should be understood that hydraulic food cutters are capable of cutting, and are used to cut, a wide variety of food products.

Figure 1:
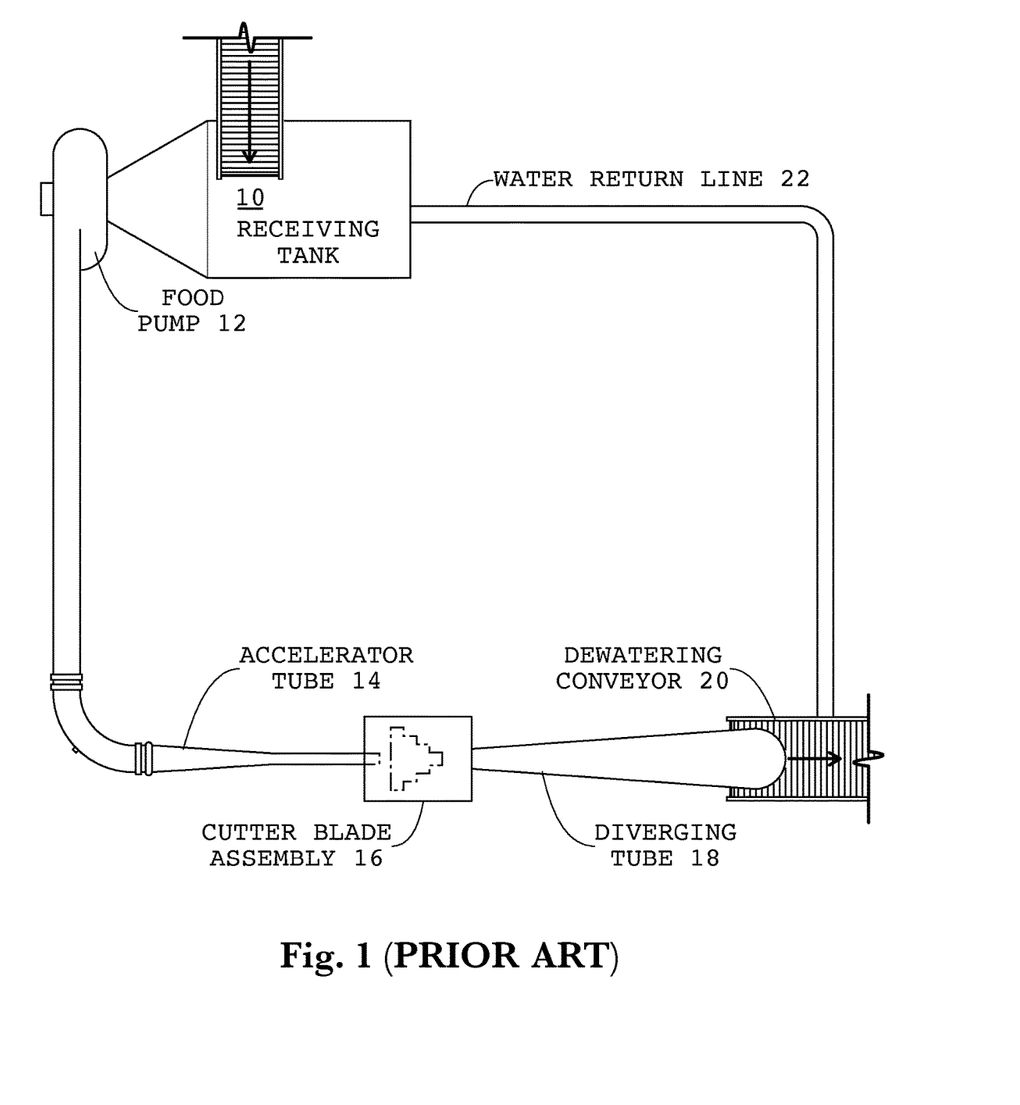
FIG. 1 is a schematic view illustrating a prior art hydrocutting system.

The basic configuration of a conventional hydrocutting system is shown, in schematic format, in FIG. 1. In a typical hydraulic cutting apparatus where potatoes are to be cut, the potatoes are dropped into a tank 10 filled with water and then pumped through conduit into an alignment chute or accelerating tube 14 wherein the potatoes are aligned and accelerated to high speed before impinging upon a fixed array of cutter blades where the potato is cut into a plurality of smaller pieces.

Peeled or unpeeled potatoes are dropped into the receiving tank 10 and a food pump 12, typically a single impeller centrifugal pump, is provided to drive the water and potatoes through the system. The pump draws water from the receiving tank and pumps the water and the suspended potatoes from the tank into the accelerator tube 14, which functions as the converging portion of a venturi. The accelerator tube 14 is used to accelerate, singulate, and align the potatoes immediately prior to impinging upon the stationary knife blades of the cutter blade assembly 16.

As noted above, the water and the food product are pumped through a decreasing diameter accelerating section conduit in order to increase the speed of the food products and water as they approach the blade. Unless otherwise specified, the term "acceleration" and its derivatives are used herein to denote both positive and negative (increasing and decreasing) changes of velocity per unit time. The water and food products increase in speed, orient, and align as they pass through the accelerating section. The accelerating section also singulates the food products, meaning the food products travelling through conduit laterally beside one another are arranged in a "single file" line before each item passes through the cutter head. In FIG. 1, the cutter head is in the cutter blade assembly 16, and is removable for service, change of cutting pattern and/or replacement.

The accelerator tube performs at least three functions. First, the accelerator tube accelerates the water and food product to the velocity required for the combination to pass cleanly and completely through the knife blade assembly. In the case of potatoes, a common velocity range is from about 40 to about 60 feet per second. Second, the accelerator tube aligns and centers each of the food products prior to impingement upon the knife blade assembly. Third, the acceleration of the product causes laterally-aligned products to separate and align longitudinally, thereby entering the cutter in a "single file" line.

Potatoes can be cut into French fry sticks as one example of the use of hydrocutting systems, and this will be used as an example hereafter. A person of ordinary skill will understand, after reading the description herein, how to adapt the apparatus described herein to other food products. Each whole potato impinging upon the knife blade assembly at high speed passes through the cutting blade array and is thereby cut into a plurality of food pieces, for example French fry pieces. The cross section of each of the food strips is determined by the arrangement of the cutter head knives.

A portion of the hydrocutting system separates the food product strips from the water once the strips are past the cutter head. It is desirable to slow down the water column and the food product strips in a controlled manner before this separation portion is encountered. This is because the strips may be fragile (depending on the food product) and gentle handling in the sections following cutting prevents breakage of, or stress on, the strips that would render the strips less desirable. The food strips thus pass with the water into the second half of the venturi which is a diverging tube 18 in which the water and the cut food pieces are decelerated back to a slower velocity. The water and cut food pieces are then deposited onto a dewatering conveyer 20. The water passes through the dewatering conveyor and is collected and recycled back to the receiving tank via a water return line 22. The cut food pieces remain on the conveyor 20 and are carried off for further processing. U.S. Pat. Nos. 5,568,755, 5,806,397, and 4,614,141 are hereby incorporated by reference.

In hydrocutting systems, fruits, vegetables, and other foods, all of which are referred to as "product" in the industry, are suspended in a water solution and the combination is conveyed from source point X to destination point Y through a water-conveying pipe, typically by a vane pump. The product and water are pumped directly through the vane pump and the pipe with little damage. In such processing systems it can be necessary to divert product from its original destination Y to a new destination Z in the pipe network. For example, in the prior art system of FIG. 1, if the product is at source point X, which may be the receiving tank 10, and it is preferred to convey the product to destination point Z, which may be a cutter blade assembly in a different tube, instead of destination point Y, which may be the cutter blade assembly 16, one must actuate a line switcher or "2 way valve" along the pipe.

Existing line switchers are designed to quickly divert flow from destination point Y to destination point Z and then back to destination point Y with minimal damage to the product being conveyed. Such devices contain moving parts that direct the flow one way or another, and therefore they often damage the product when they are used. It is a weakness of conventional line switchers that they can only provide an "either-or" switch. That is, when the product flows from source X, the prior art can only present the destination as either Y or Z, and not Y and Z.

According to the present technology of which the inventors are aware, there is no device that allows damage-free diversion of food product being conveyed from source X to either destination Y, or destination Z, or to both destinations Y and Z.

BRIEF SUMMARY OF THE INVENTION

The present invention is a device that diverts flowing food product suspended in a liquid from a source X to either destination Y, or destination Z, or to both destinations Y and Z. The device thus has the ability to supply material to one or both of the destinations and the device can be used to supply material to both destinations simultaneously. The invention achieves this without damaging the product, and without any moving parts in the diverting device.

The geometry of the device does not change during operation. The device can gently divert all suspended product and liquid to one outlet or the device can gently distribute product to both outlets. The device may switch during operation and will not accumulate product in the unused portion.

The device preferably guides liquid, which may be water in which pieces are suspended, from an entry to one or both exits. This is accomplished by the structural features of the device, which features are advantageous because they guide the flowing liquid and pieces to the central axes of the passages due to the pressure and flow paths of the liquid.

In one embodiment, the liquid is water and the water flows into a drum, the axis of which is transverse, and preferably perpendicular, to an entry conduit's axis. The drum is preferably cylindrical, and most preferably circular cylindrical. The axis of the entry conduit is radially offset substantially from the drum's axis, thereby causing the water and suspended pieces to flow in a rotational direction around the circumference of the drum and out of two outlet tubes that may be at opposing ends of the drum. The suspended pieces may have a density that is substantially equal to, or less than, the liquid. The outlet tubes may be of smaller diameter than the drum, and may have axes that are spaced radially away from the axis of the drum.

This configuration causes the flowing water to have its greatest velocity along a line substantially located along the axis of the drum near where the axis of the entry conduit passes near the drum axis, and which bends toward the axes of the outlet tubes, which preferably coincide but may be radially spaced from the drum axis. Thus, water and pieces flowing into the drum encounter forces that tend to keep the pieces along the axis of the drum, and, as they flow toward one or both of the axes of the outlet tubes, toward the axes of the outlet tubes. This phenomenon keeps the pieces from striking the sidewalls of the device and allows them to flow through the device without damage or clogging.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 2:
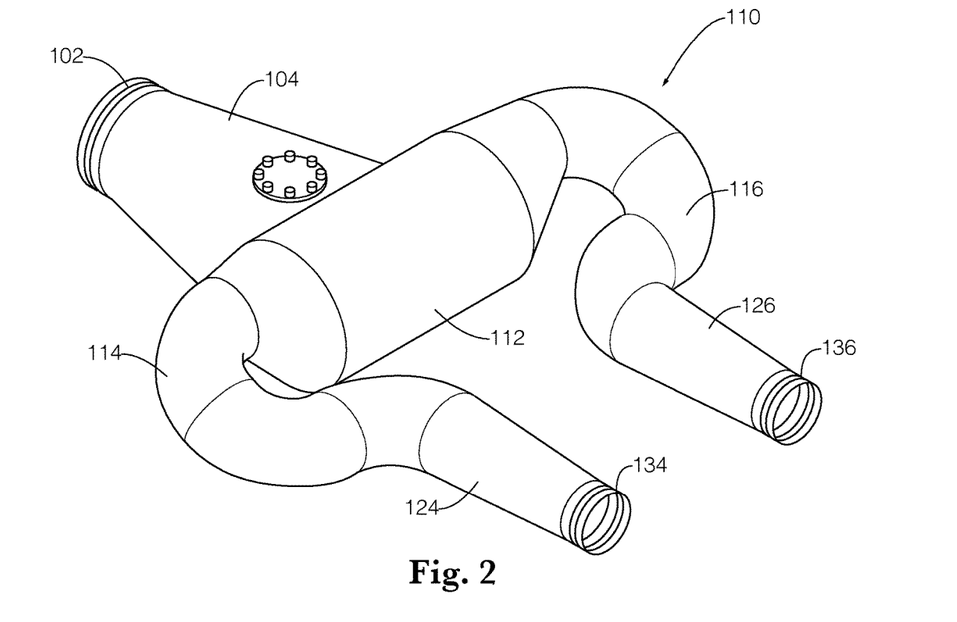
FIG. 2 is a view in perspective illustrating an embodiment of the present invention.
Figure 3:
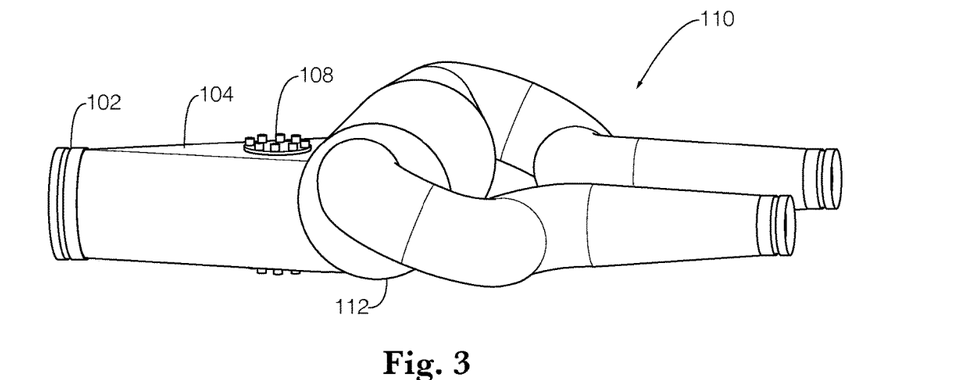
FIG. 3 is a view in perspective illustrating the embodiment of FIG. 1.
Figure 4:
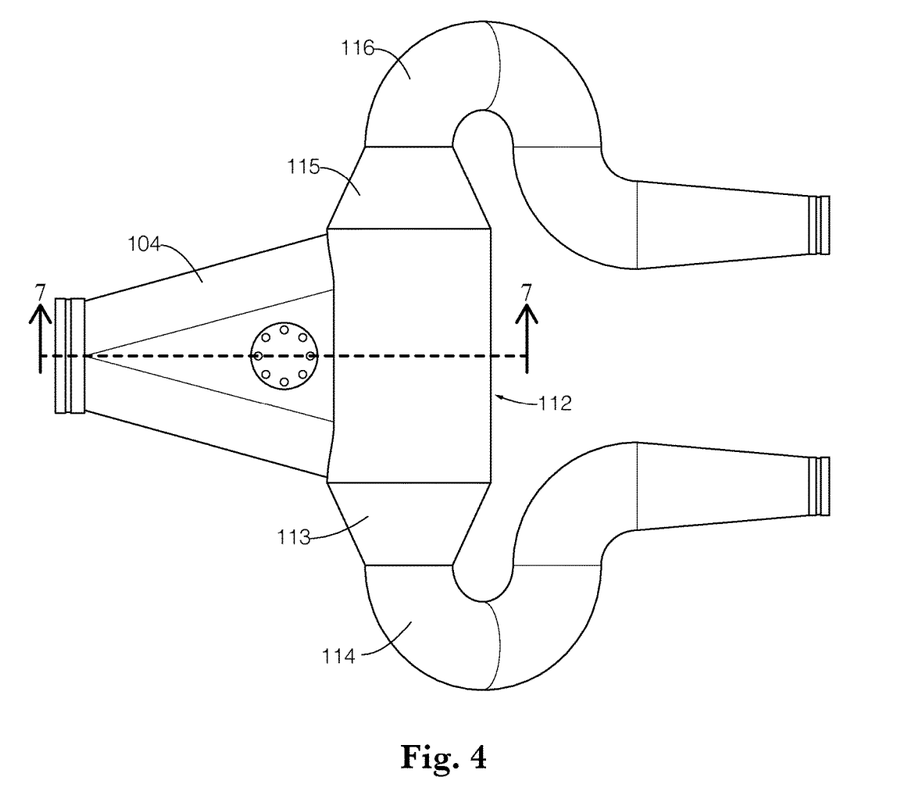
FIG. 4 is a top view illustrating the embodiment of FIG. 1.

Referring to the illustrations of FIGS. 2-8, the preferred distributor valve 110 has a tapered conduit 104 with an intake port 102 that receives water and suspended product pieces (not shown). The distributor valve 110 may be disposed, in a representative example in the FIG. 8 hydrocutting system, between the food pump 212 and the accelerator tubes 214 and 214'. In this system, the food pump 212 may pump the water and suspended product pieces into the intake port 102. The tapered conduit 104 is an entry passage that may slow the liquid and suspended product pieces flowing through it by its increasing cross-sectional area leading away from the intake port 102 in the direction of flow. The tapered conduit 104 may be conically shaped, or flat with a wider end opposite the intake port 102, in which the tapered conduit 104 may widen in one or some directions, as shown in FIGS. 2 and 4. This widening can permit the suspended product pieces to begin migrating laterally in the tapered conduit 104, which, as will become apparent from the description below, permits the product pieces to begin to migrate toward one outlet even before exiting the tapered conduit 104.

An angled plate 106 may be mounted in the tapered conduit 104 at an acute angle to the direction of flow of water and food pieces. The angled plate 106 may be a stainless steel plate with slotted openings extending along most of its length and through which water can flow. This configuration allows the angled plate 106 to deflect product pieces larger than the slotted openings downwardly in the orientation of FIG. 5. The aperture allows access to the interior of the distributor valve 110 for camera mounting or any other contemplated purpose. The angled plate 106 may be attached to the upper interior of the tapered conduit 104 near the intake port 102 and angle downwardly (in the orientation of FIGS. 3 and 5) to about halfway to the lower interior of the tapered conduit 104. The amount the angled plate 106 extends along the height of the tapered conduit 104 may be modified depending on the shapes and sizes of the product pieces and other factors a person having ordinary skill will understand. Thus, the angled plate 106 permits water to flow through the entire interior of the distributor valve 110 while product pieces are guided by the angled plate 106 away from the cap 108 and through the preferred flow channels of the distributor valve 110.

The drum 112 is a cylindrical body with a longitudinal axis that is transverse, and preferably perpendicular, to the longitudinal axis Ta of the tapered conduit 104. The drum 112 is preferably a circular cylinder, but may be elliptically cylindrical or any other cylindrical shape, including without limitation rectangular, triangular, polygonal or irregular. The drum 112 may serve as a plenum chamber to guide liquid and suspended product pieces flowing from the tapered conduit 104 along the normal flow path of the distributor valve 110. The largest outer dimension of the drum 112, such as the diameter, may be at least as great as the height of the tapered conduit 104, and is preferably larger in the direction of height in the orientation of FIG. 5. A large opening in the sidewall of the drum 112 receives the end of the tapered conduit 104 at a liquid-impermeable bond to form an entry through which the water and suspended product pieces may flow from the intake port 102 to the drum 112. The drum 112 and all other components of the distributor valve 110 are made of stainless steel unless noted otherwise, but the materials are not considered critical.

Figure 5:
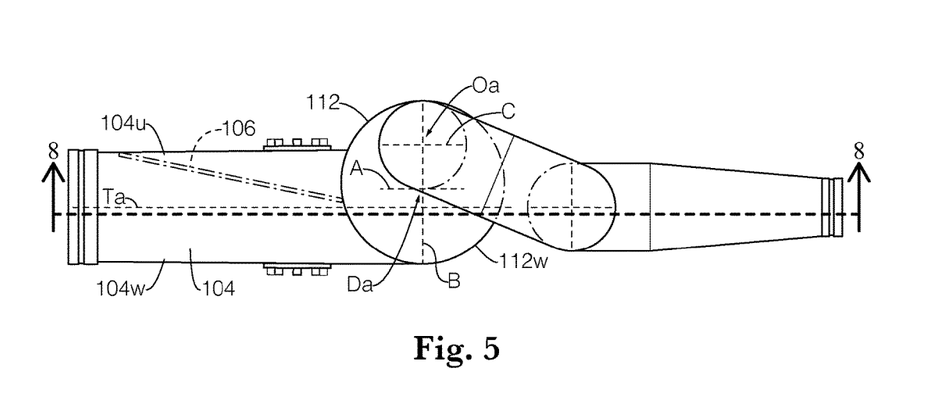
FIG. 5 is a side view illustrating the embodiment of FIG. 1.
Figure 6:
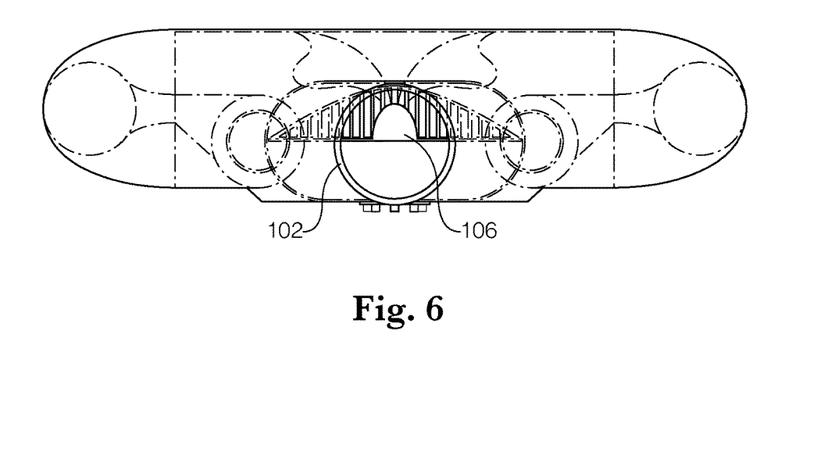
FIG. 6 is an end view illustrating the embodiment of FIG. 1.
Figure 7:
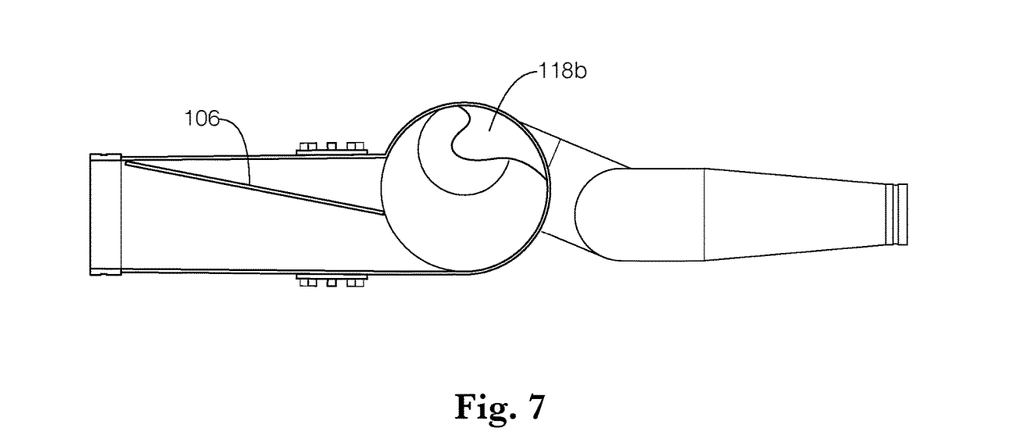
FIG. 7 is a side view in section illustrating a portion of the embodiment of FIG. 4 through the lines 7-7.
Figure 8:
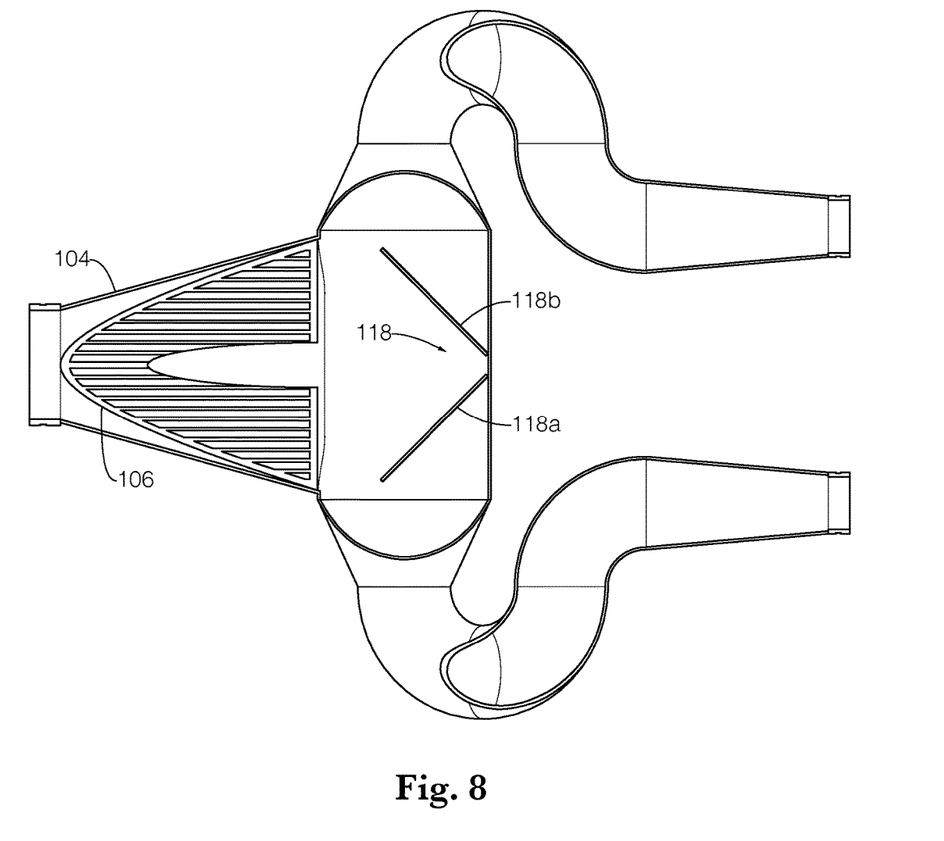
FIG. 8 is a bottom view in section illustrating the embodiment of FIG. 5 through the lines 8-8.

It can be seen, particularly from the view of FIG. 5, that the tapered conduit 104 meets the drum 112 with the tapered conduit's 104 longitudinal central axis Ta below the drum's 112 longitudinal central axis Da, which is preferred. The relative directional references, such as "below", are in relation to the orientation of FIG. 5, and could be moved in space to be other directions, which the person of ordinary skill will understand. In FIG. 5, the drum's 112 axis Da extends into the plane of the illustration, and therefore the axis Da is located at the point where the line A crosses the line B. The lowest wall 104w of the tapered conduit 104 may be substantially a tangent to the wall 112w of the drum 112, and the uppermost wall 104u is above the axis Da but below the top of the drum 112. This may be reversed so that the uppermost wall 104u is substantially a tangent to the wall 112w of the drum 112, and the lowermost wall 104w may be just below the axis Da. Alternatively, the uppermost wall 104u may be substantially a tangent to the wall 112w of the drum 112, and the lowermost wall 104w may also be substantially a tangent to the wall 112w of the drum 112.

As is shown in FIG. 5, the tapered conduit 104 attaches to the drum 112 at a position lower than vertically central of the drum 112. That is, the axis Ta of the tapered conduit 104 is perpendicular to, but below, the axis of the drum 112. This configuration causes water entering the drum 112 from the tapered conduit 104 to flow upwardly as guided by the portion of the drum's 112 circular cylindrical sidewall opposite the tapered conduit 104. The water flowing into the drum 112 has a circumferential component, and it is theorized that this rotational movement applies forces to the potatoes (or any other food product) to cause them to stay along the central axis Da of the drum 112. The effect of rotational movement may be enhanced by the angled plate 106, which forces food pieces radially away from the coaxial axes Oa of the outlet tubes 114 and 116. The food pieces are urged radially toward the coaxial axes Oa of the outlet tubes 114 and 116 once they pass the angled plate 106.

The resistance to fluid flow caused by the sidewalls of the water passages, including the tapered conduit 104 and the drum 112, may also cause the pressure of the water along the axis of the drum 112 to be less than the pressure of the water at the sidewall of the drum 112. Because of this pressure differential, solid product pieces are forced to the lower pressure region along the axis of the drum 112.

In an alternative embodiment, the tapered conduit 104 attaches to the drum 112 at an angle to Da so that the axis Ta of the tapered conduit 104 is angled relative to the axis Da of the drum 112. This is contemplated in case a preferential flow to one end of the drum 112 is desired over another end, such as when a first part of the cutting system is preferred and the second part is only preferred if the first part has become blocked.

As best seen in FIGS. 2 and 4, the opposing longitudinal ends of the drum 112 are preferably mounted to conical outlets 113 and 115. These conical outlets 113 and 115 have the same diameter as the drum 112 where they attach to opposite ends of the drum 112, and angle to smaller diameters than the drum 112 where they attach to the outlet tubes 114 and 116, respectively. Thus, the conical outlets 113 and 115 provide a reduction in diameter of the passages through which the water and suspended pieces flow. The axes of the conical outlets 113 and 115 may be offset radially, preferably in an upward direction in the orientation of FIG. 5, from the axis of the drum 112, as best viewed in FIG. 5. The axes of the conical outlets 113 and 115, which are both aligned along the axis Oa, are shown in FIG. 5. In FIG. 5, the conical outlets' 113 and 115 axes are directed along a line extending into the plane of the figure, and therefore the axis is represented by a point where two lines (B and C) cross.

A deflector 118 may be mounted in the drum 112 slightly above the point where the axis Ta of the tapered conduit 104 intersects the far wall 112w of the drum 112. The deflector 118 is preferably shaped to guide liquid and suspended product pieces laterally of the tapered conduit 104 axis Ta, and this laterally guided liquid flows generally parallel to the drum's 112 axis Da. The deflector 118 has a shape that directs the water and suspended product pieces to one or both of the opposing longitudinal ends of the drum 112. In one embodiment (FIG. 8), the deflector 118 has two curved panels 118a and 118b that intersect at a v-shaped joint with the joint pointing away from the intake port 102 and the curved panels extending symmetrically along the longitudinal axis of the drum 112 toward the opposing longitudinal ends of the drum 112. Thus, liquid and suspended product pieces flowing through the tapered conduit 104 and then the drum 112 may be directed by the deflector 118 to flow out of the drum at one or both of the opposite conical outlets 113 and 115.

The outlet tube 114 connects at an upstream end to the narrow end of the conical outlet 113, and the outlet tube 116 connects at an upstream end to the narrow end of the conical outlet 115. Each of the downstream ends of the outlet tubes 114 and 116 mounts to another water and product piece carrying conduit, which may be the accelerator tubes 214 and 214' in the conventional system shown in FIG. 9, or equivalent. The outlet tubes 114 and 116 have axes that are, at least where they meet the conical outlets 113 and 115, transverse, and preferably perpendicular, to the longitudinal axis Ta of the tapered conduit 104, and preferably substantially parallel to the longitudinal axis Da of the drum 112. The longitudinal axes of the outlet tubes 114 and 116 may be coaxial with one another, the axes Oa of the conical outlets 113 and 115, and the longitudinal axis of the drum 112. However, it is preferred that the longitudinal axes of the outlet tubes 114 and 116 are coaxial with the axes Oa of the conical outlets 113 and 115 and spaced radially from the longitudinal axis of the drum 112 as shown in FIG. 5. The outlet tubes 114 and 116 continue the flow of water and suspended product pieces through the distributor valve 110, and may curve to guide water and suspended product pieces to a direction substantially parallel to the longitudinal axis of the tapered conduit 104.

The distributor valve 110 guides the water and suspended product pieces from the intake port 102 source to (a) the outlet tube 114 destination, (b) the outlet tube 116 destination, or (c) both (outlet tubes 114 and 116) destinations. Where the water and suspended pieces flow, whether scenario (a), (b), or (c), depends only on the conditions outside of the distributor valve 110. No structural changes occur within the distributor valve 110 to cause water and suspended pieces to flow to a different destination or destinations. Instead, only conditions downstream of the distributor valve 110 determine where the water and suspended pieces flow within the distributor valve 110. The manner in which the conditions dictate flow will be described after an explanation of the flow path through the distributor valve 110.

When the water and suspended food product pieces flow through the tapered conduit 104 to the drum 112, the water follows substantially along the path of the tapered conduit's axis Ta. The product pieces are driven downwardly by the angled plate 106 and therefore follow a slightly different direction. Thus, the pieces enter the drum 112 with a "product piece center of mass" slightly below the axis Ta, and below the end of the angled plate 106 closest to the drum 112. The water's center of mass is substantially along the axis Ta at this point. When the water and product pieces enter the drum 112, the water flows upwardly due to the drum's 112 upwardly curved distal wall 112w causing rotation of the water, which creates a vortex in the drum 112 that influences the suspended pieces therein. It is theorized that this vortex causes the speed of the water in the drum to be greatest along about the axis Da, which causes the lowest pressure to be at Da, thereby causing the pieces to be urged toward the axis Da from the slightly higher pressure closer to the wall 112w. Regardless of the explanation for the phenomenon, the pieces move along the axis Da.

Upon reaching the axis Da of the drum 112, the product flows in an arcuate or helical manner up and toward the nearest open outlet tube 114 or 116. A set of stator fins that comprise the deflector 118 help direct the product and water substantially equally to the outlet tubes 114 and 116. Because the cross sections at the opposing ends of the drum 112 are preferably reduced as the product pieces and liquid proceed toward the outlet tubes 114 and 116, the velocity of the working fluid increases, thereby creating a low pressure zone along the central axes Oa that helps move the product toward the respective outlet tubes 114 and 116. The suspension has substantial momentum in the direction of an exit and is accelerated to its exit velocity in the conical outlets 113 and 115.

The water and suspended pieces near the axis Da thus flow through a path that extends into one or both of the conical outlets 113 and 115, then into the outlet tubes 114 and 116, and then out of the outlet ports 134 and 136. Because the water flowing through the conical outlets 113 and 115 and outlet tubes 114 and 116 is fastest at the axes of the structures (according to fundamental laws of fluid dynamics), the pressure along those axes will also be lowest, thereby tending to maintain the pieces along those axes as the pieces flow therethrough. Therefore, the flow path of the pieces, once they enter the drum 112, is along the axis Da, then along the axes Oa, and then centrally located in the pipes/tubes. This prevents the pieces from making substantial contact with the sidewalls, thereby reducing bruising or other damage.

Which of the conical outlets 113 and 115 the distributor valve 110 guides the water and suspended product pieces to is determined by whether a substantial amount of fluid is able to flow through downstream components to which the outlet tubes 114 and 116 lead. In one embodiment shown in FIG. 9, one or more valves, such as ball valves 250 and 250' or other conduit-blocking structures, are positioned downstream of the distributor valve 110 along the conduits through which the flow of liquid and suspended product pieces pass, for example, near each of the outlet ports 134 and 136. Valves may be mounted downstream of the cutter blade assemblies 216 and 216' in each of the conduits through which the flow of liquid and suspended product pieces pass. The valves 250 and 250' may be conventional ball valves and are known to the person of ordinary skill to block the flow of water and/or food product pieces through the conduit. The valves 250 and 250' may be actuated, preferably by a central computer 260, to close off the flow of water and/or product pieces through one or both of the flow paths that are downstream of the distributor valve 110.

Figure 9:
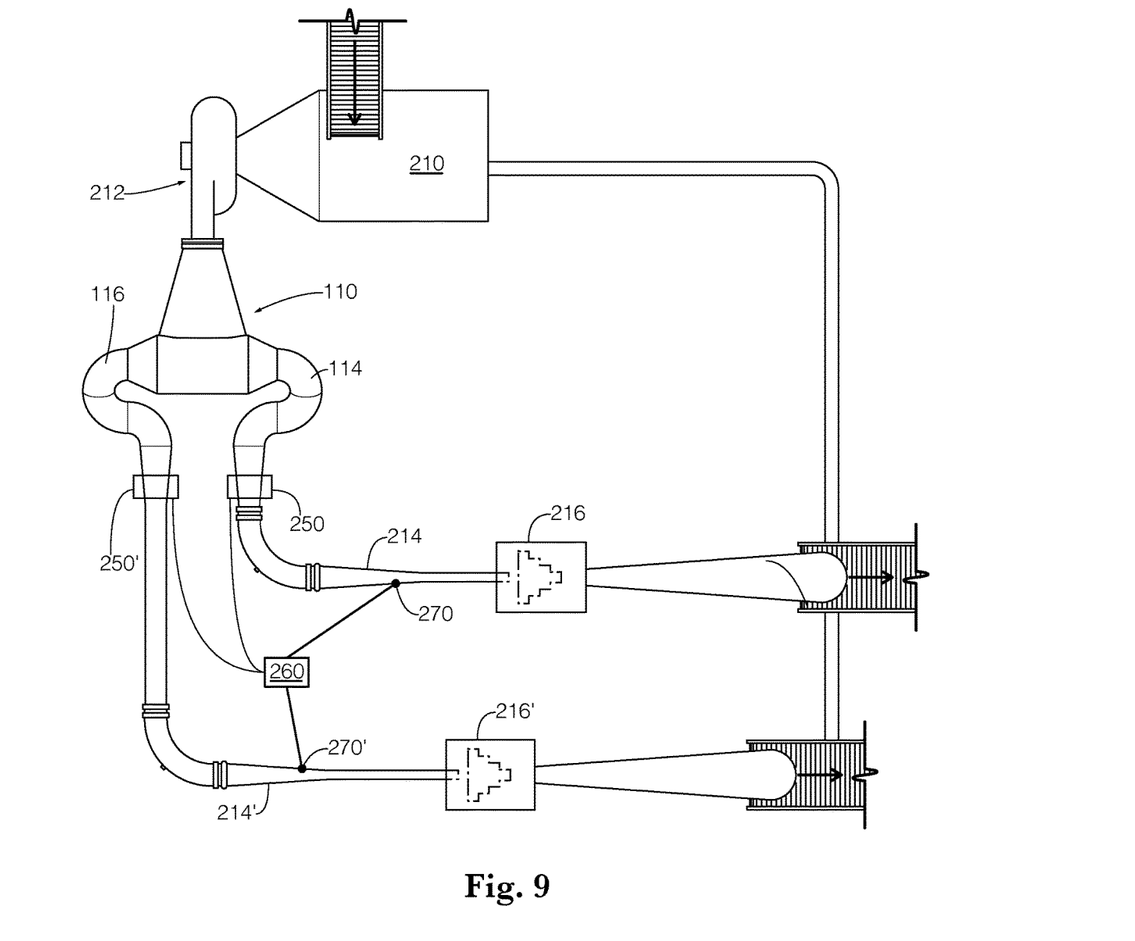
FIG. 9 is a schematic view illustrating a hydrocutting system according to the present invention.

Conventional pressure sensors 270 and 270' are preferably disposed in various locations along the path that the water and product pieces follow. Such sensors detect pressure, pressure changes, and/or other characteristics that indicate that a flow path is, or is about to be, blocked. Upon detecting a programmed condition, the sensor(s) signals the computer 260 or other device that can open or close the valve 250 or the valve 250' along the same path where the flow path is, or is about to be, blocked. An open valve permits the water and suspended product pieces to flow through the conduit, and a closed valve halts most or all flow through that conduit. Thus, for example, if potatoes block the cutter assembly 216, the accelerator tube 214 or any other portion of the flow path, the sensor 270 detects the pressure change that results from blocked flow, and the valve 250 is closed, thereby preventing potatoes from backing up any further and allowing the blockage to be removed manually without substantial loss of water from the system while operating.

Closing the valve 250 prevents further backup of food product pieces because of how the distributor valve 110 functions. By blocking the flow of water through a downstream flow path, the distributor valve 110 blocks the flow at the point in the drum 112 where the water can flow in one of two directions. If water cannot flow through, for example, the outlet tube 114, the water and suspended product pieces flowing into the drum 112 cannot flow laterally to the outlet tube 114. They instead flow to the outlet tube 116, without any change in the physical structure of the distributor valve 110, because there is a continuous flow of water and suspended product pieces in the direction of outlet tube 116 and no flow in the direction of the outlet tube 114. This is so even though the valve 250 that prevents water and suspended product pieces from flowing through the outlet tube 114 may be located far downstream of the distributor valve 110. Of course, the speed of the pump 212 may be reduced by the computer 260 when the valve 250 is closed to prevent flow that is too rapid.

During operation, whole potatoes (or any other food product) that are placed in the tank 210 with working fluid, such as water, are pumped to the port 102. The product and working fluid may be slowed in the tapered conduit 104, causing the product to fall out of suspension of the water. The angled plate 106 drives the potatoes downwardly while water flows through the angled plate 106. The product pieces then flow close to the bottom of the distributor valve 110 where the product pieces are affected by water flowing through the preferably perpendicular drum 112. The water and product flow out one or both of the two outlet tubes 114 and 116, depending on which of the outlet tubes leads to a conduit with an open downstream valve (or valves). Thus, if the valve 250 (or valves) downstream of the outlet tube 114 is open and the valve 250' (or valves) downstream of the outlet tube 116 is open, water and food product pieces flow through the distributor valve 110 and substantially equally out of both outlet tubes 114 and 116. If the valve 250 downstream of the outlet tube 114 is closed, water and food product flow through the opposite outlet tube 116. If the valve 250' downstream of the outlet tube 116 is closed, water and food product flow through the opposite outlet tube 114. Open valves 250 and 250' permit food products and water to flow to an outlet of the distributor valve 110, and closed valves halt all flow to that outlet of the distributor valve 110.

Downstream of the distributor valve 110, if potatoes block a passage on either side, such as by failing to singulate in the acceleration tube, one of the pressure sensors 270 and 270' detects this pressure difference. The computer 260 receives this signal, and, according to its programming, and the computer 260 rapidly closes the valve 250 or 250' on that side. This thereby prevents a significant amount of potatoes from backing up against the blocking potatoes, which can occur back to the distributor valve 110 without this safety feature. Instead, because of the closed valve, potatoes merely start flowing to the open side in the distributor valve 110.

The water and potatoes thus flow through one or both of the two outlet tubes that is/are open. If both outlet tubes are open and a block is subsequently formed downstream of one outlet tube, the water and potatoes flow in the distributor valve 110 automatically to the unblocked side. This is due to hydraulic forces, such as fluid flow out of the outlet tube leading to an unblocked downstream path, and the lack of fluid flow out of the outlet tube that leads to the blocked downstream path.

If flow is only through one side of the distributor valve 110, and that side subsequently gets blocked, the system can immediately open the valve in the previously-closed side as long as conditions permit it so that water and potatoes may flow through that previously-blocked side. The blockage is minimized in this manner, and the blocked side can be unblocked manually while product still flows through the open side. During the blocking and unblocking no changes occur in the distributor valve 110 that move any physical structure of the distributor valve 110. Instead, merely changing the status of the valve downstream of the distributor valve 110 is enough to modify how product flows through the distributor valve 110.

It should be noted that the valves may not be critical under certain circumstances. For example, the effect of a sudden blockage may be the same as when a valve is closed, inasmuch as the flow in the distributor valve 110 is automatically re-directed. Thus, the ball valves may not be required if the blockage similarly halts all hydraulic flow and the water and potatoes suspension is re-directed automatically by the distributor valve 110.

It should also be noted that the location and number of outlet tubes, along with the entry location of the tapered conduit, are shown herein as examples, and are not limiting. Therefore, it is contemplated to position outlet tubes other than at the longitudinal ends of the drum as shown in the embodiments herein. For example, it is contemplated to mount outlet tubes along the drum wall 112w to form radial outlet tubes. There could be two, three, four, five or more such outlet tubes. Still further, the tapered conduit may enter near the top of the drum, rather than the bottom of the drum as shown herein, with end outlet tubes or radial outlet tubes extending from the drum.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A distributor for guiding solid food pieces suspended in a working liquid to one or both of at least first and second destinations, the distributor comprising:
   (a) a tapered entry conduit having a first end and an opposite, larger second end connected by a central longitudinal conduit axis;
   (b) a cylindrical drum to which the second end of the tapered entry conduit is mounted, the drum having opposing first and second longitudinal ends connected by a central longitudinal drum axis, the conduit axis being substantially perpendicular to, and radially spaced from, the drum axis, wherein a floor of the tapered entry conduit is aligned along a tangent to a drum sidewall;
   (c) a first conical outlet having:
      (i) a larger end of the first conical outlet having a first diameter, the larger end of the first conical outlet attached to the first longitudinal end of the drum; and
      (ii) a smaller end of the first conical outlet with a diameter that is smaller than the first diameter, the smaller end of the first conical outlet attached to a first outlet tube extending to the first destination; and
(d) a second conical outlet having:
   (i) a larger end of the second conical outlet having a second diameter, the larger end of the second conical outlet attached to the second longitudinal end of the drum; and
   (ii) a smaller end of the second conical outlet with a diameter that is smaller than the second diameter, the smaller end of the second conical outlet attached to a second outlet tube extending to the second destination;
wherein an axis of the first conical outlet is coaxial with an axis of the second conical outlet, and the conical outlet axes are spaced radially from the drum axis.

2. The distributor in accordance with claim 1, wherein the conical outlet axes are substantially parallel to the drum axis, whereby a first flow direction of working liquid and suspended food pieces out of the first conical outlet is substantially axially of the drum, and a second flow direction of working liquid and suspended food pieces out of the second conical outlet is substantially axially of the drum and substantially opposite of the first flow direction.

* * * * *